United States Patent [19]

Melin

[11] Patent Number: 6,151,492
[45] Date of Patent: Nov. 21, 2000

[54] METHOD AND AN ARRANGEMENT FOR SETTING UP OF CONNECTION IN A TELECOMMUNICATION NETWORK

[75] Inventor: Stefan Melin, Stockholm, Sweden

[73] Assignee: Telefonaktiebolaget LM Ericsson, Stockholm, Sweden

[21] Appl. No.: 08/894,918

[22] PCT Filed: Feb. 29, 1996

[86] PCT No.: PCT/SE96/00261

§ 371 Date: Sep. 2, 1997

§ 102(e) Date: Sep. 2, 1997

[87] PCT Pub. No.: WO96/27997

PCT Pub. Date: Sep. 12, 1996

[30] Foreign Application Priority Data

Mar. 3, 1995 [SE] Sweden ................................ 9500784

[51] Int. Cl.$^7$ ................................................. H04M 11/10
[52] U.S. Cl. ........................... 455/414; 455/458; 455/456
[58] Field of Search .................................. 455/433, 432, 455/455, 517, 524, 525, 518, 414, 456, 458, 462, 450; 370/17; 379/59

[56] References Cited

U.S. PATENT DOCUMENTS

| | | |
|---|---|---|
| 4,399,555 | 8/1983 | MacDonald et al. . |
| 5,224,150 | 6/1993 | Neustein . |
| 5,329,578 | 7/1994 | Brennan et al. ........................ 455/414 |
| 5,457,680 | 10/1995 | Kamm et al. ............................. 370/17 |
| 5,526,400 | 6/1996 | Nguyen ..................................... 379/59 |
| 5,539,924 | 7/1996 | Grube et al. ........................... 455/34.1 |
| 5,548,636 | 8/1996 | Bannister et al. ...................... 455/414 |
| 5,590,174 | 12/1996 | Tsuji et al. ................................. 379/58 |
| 5,752,186 | 5/1998 | Malckowski et al. .................. 455/414 |
| 5,781,858 | 7/1998 | Lantto et al. ........................... 455/414 |
| 5,926,754 | 7/1999 | Cirelli et al. ........................... 455/414 |
| 5,966,651 | 10/1999 | Sibecas ................................... 455/414 |
| 5,974,331 | 10/1999 | Cook et al. ............................. 455/414 |

FOREIGN PATENT DOCUMENTS

| | | |
|---|---|---|
| 0 431 453 A2 | 6/1991 | European Pat. Off. . |
| 0 675 660 A1 | 4/1995 | European Pat. Off. . |
| 26 59 656 | 12/1977 | Germany . |
| 2 075 799 | 11/1981 | United Kingdom . |
| WO 93/05622 | 3/1993 | WIPO . |

Primary Examiner—Edward F. Urban
Assistant Examiner—Tilahun Gesesse
Attorney, Agent, or Firm—Burns, Doane, Swecker & Mathis, L.L.P.

[57] ABSTRACT

The invention relates to a subscriber service for establishing a connection between an A-subscriber (A1) and a B-subscriber (CXN61) in a telecommunications network (601). The A-subscriber wishes to be connected to any B-subscriber located in a given geographical area (GL64). The A-subscriber (A1) enters a subscriber service code which is received in a control unit (CPUk) in a switching station (PBXk). The subscriber service code includes a connection path (PBX1-REX2-BS64) to the area (GL64). The control unit (CPUk) localizes B-subscribers available in the are (GL64) and stores these subscribers in a preliminary list in a memory (605). Also stored in the list are B-subscribers that are permanently associated with the area (GL64). The control unit then set one or more B-subscribers from the preliminary list and then establishes the connection.

27 Claims, 9 Drawing Sheets

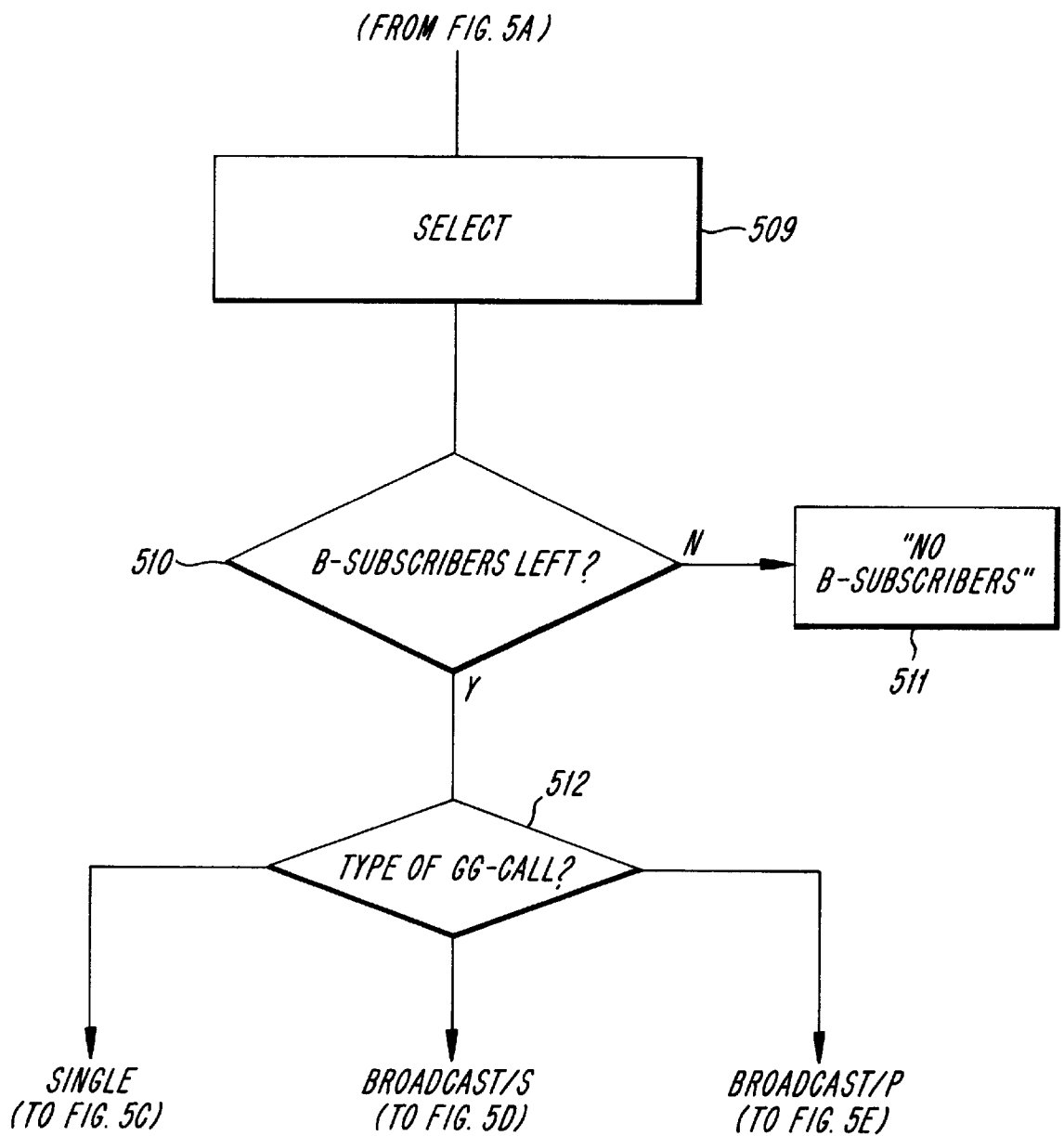

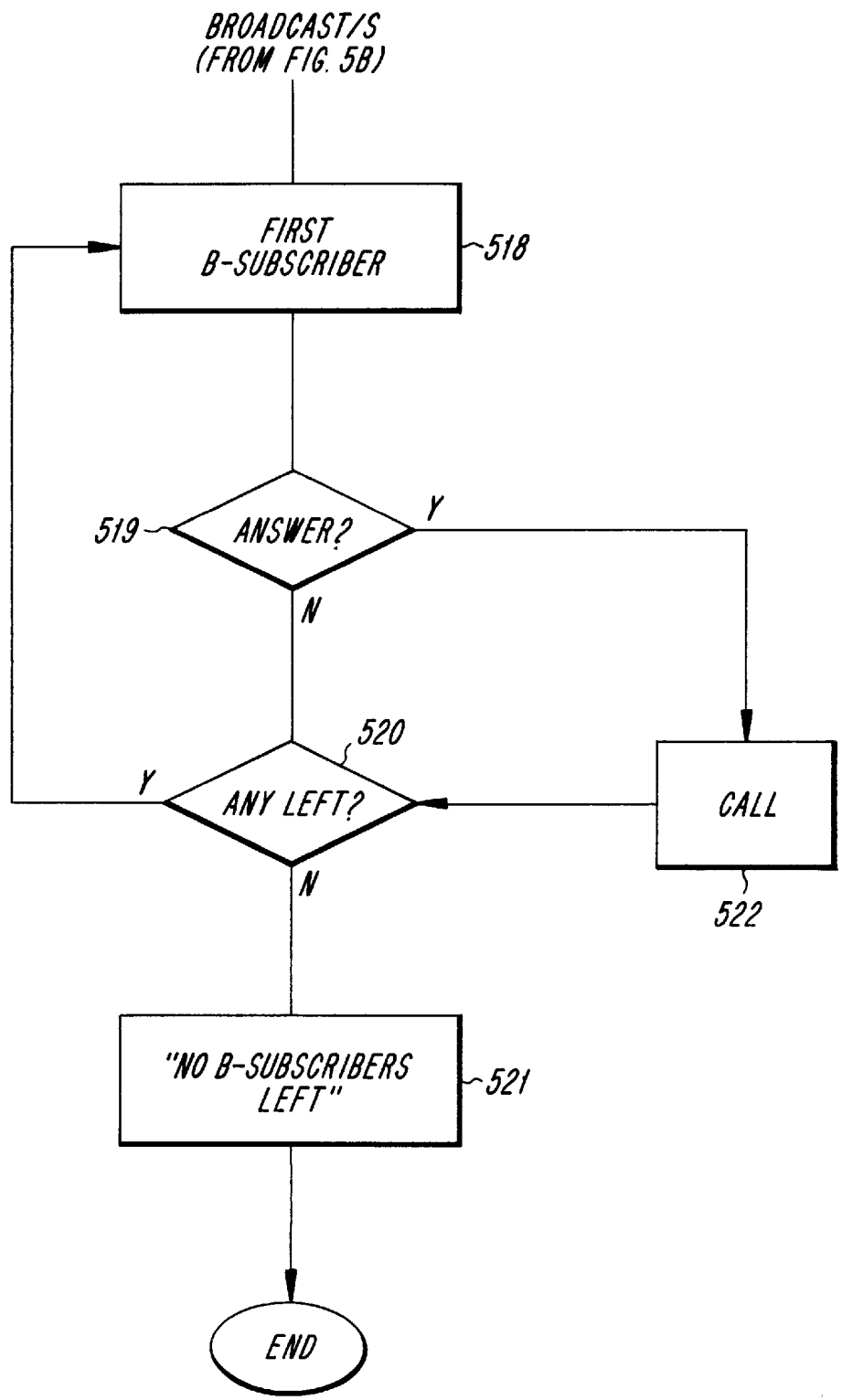

001
METHOD AND AN ARRANGEMENT FOR SETTING UP OF CONNECTION IN A TELECOMMUNICATION NETWORK

TECHNICAL FIELD

The present invention relates to a subscriber service for establishing a connection between subscribers in a telecommunications network which includes a radio communications network. The services are intended for all types of public and private radio networks and for both speech and data communication. The invention also relates to a method of implementing the service, and to a telecommunications network in which the service is implemented.

DESCRIPTION OF THE BACKGROUND ART

In a telecommunications network, a connection is setup between a calling party (A-subscriber) and a called party (B-subscriber), by the A-subscriber dialling or entering a subscriber number. The information contained in the subscriber number results in the setup of the connection from the A-subscriber to the telecommunications means of the B-subscriber, for instance to a telephone, a facsimile apparatus or a modem, via various subscriber switching stations in the telecommunications network. In a known network, a given subscriber number will thus always result in establishing a connection to the same communications means owned by a given subscriber.

Such usage of a subscriber number presents a problem when the A-subscriber is not interested in being connected to a particular B-subscriber, but wishes instead to be connected to any B-subscriber whatsoever who is associated with or located in a particular geographical area and possibly also belongs to a particular category of subscriber. When the telecommunications network includes a radio network comprising mobile or cordless (wireless) radio stations, the A-subscriber never knows which persons can be reached in a given geographical area at a given point in time, since the B-subscribers constantly move within the area covered by the radio network. The A-subscriber may therefore be forced to make several attempts before finding a B-subscriber who is located in the desired geographical area and who belongs to the desired subscriber category. It is also necessary for the A-subscriber to be acquainted with all subscriber numbers of all conceivable B-subscribers. Furthermore, it is not possible for the A-subscriber to reach several B-subscribers with the use of solely one subscriber number.

EP 0,431,453 discusses this problem and describes a communications radio system which can be used in airports for instance. In order to establish communication between two parties, of which the called party works with a certain aircraft, there is used a number and an object sign which denotes personnel category and aircraft. For instance, when wishing to speak with the person refuelling Pan Am's flight 743, the object sign 23-743 is entered. The first digit denotes the airline (Pan Am), the second digit denotes the occupation of the person paged (gasoline truck driver) and the last three digits denote the aircraft being refuelled (flight 743). This enables the calling party to speak with someone who fulfils certain conditions, rather than with a separate person. For instance, when the calling party is only interested in speaking to a gasoline truck driver, irrespective of the airline with which he/she is employed and irrespective of aircraft, an object sign 03-000 is inserted. In this case, the zeros function as so-called jokers or wild cards. One drawback with this system is that the called party (the gasoline truck driver employed by Pan Am) must manually insert information into the system each time he commences a job, wherewith the system is informed of the nature of the work involved and the identity of the aircraft on which work is to be performed. The called party must also inform the system when the work has been completed.

U.S. Patent Specification U.S. Pat. No. 5,224,150 describes a person-paging system which includes a plurality of central stations, each of which controls a number of pagers. Each central station includes a profile or list of transmission services for each pager associated with a respective central station. Among other things, the profile includes a list of identification numbers to which the pagers are receptive, therewith enabling a caller to transmit a paging message to one or more pagers.

U.S. Patent Specification U.S. Pat. No. 4,399,555 describes a radio telephone system which provides both conventional subscriber radio telephony and a radio telephony service of the dispatch type. A dispatch unit is able to communicate with several of the mobile units associated with the dispatch unit. The mobile units may be located in or in the vicinity of one of the cells that covers the total geographical area within the interest area of the dispatch unit. The interest area may be the total cellular traffic area or a part of said total area. The dispatch unit utilizes one or more codes to call all mobile units or a predetermined number of the total number of mobile units.

DISCLOSURE OF THE INVENTION

A telecommunications network which includes a radio communications network will include the mobile or cordless (wireless) radio stations that constantly move within the area covered by the radio network. The invention is intended to solve a problem which arises when establishing a connection from a calling A-subscriber to one or more called B-subscribers associated with or located in a particular geographical area constituting a part of the area covered by the radio network. The B-subscribers may also belong to a special subscriber category, by virtue of allocating subscriber categories to certain B-subscribers or to all B-subscribers. With the aid of the invention, the A-subscriber shall be able to setup a connection with the B-subscribers that are associated with a geographical region given by the A-subscriber. Alternatively, the A-subscriber shall be able to set up with the aid of the invention a connection with those B-subscribers that are associated with the area or region given by the A-subscriber and shall have a subscriber category indicated by said A-subscriber.

The aforesaid problem is solved with the aid of a subscriber service that is implemented in the telecommunications network. The service is fully automated, i.e. the A-subscriber need only enter information that defines a desired geographical area and possibly a desired type of connection and/or a desired subscriber category. The information entered by the A-subscriber is hereinafter referred to as the subscriber service code or Geographic Group number (GG-number). The telecommunications network then automatically sets up a connection with those B-subscribers that fulfil the conditions disclosed in the GG-number.

The aforesaid geographical region or area is an area covered by one or more base stations in the radio network, wherein a geographical group is a group of telephone extensions or subscribers that are associated with or located in such an area and who can be reached with one and the same GG-number.

The invention can be described more explicitly as a method of implementing a connection service. The service is implemented in a telecommunications network that includes a fixed network and a radio communications network. The radio network includes switching stations, radio exchanges and base stations. The service enables a connection to be obtained between the calling A-subscriber and one or more called B-subscribers. The B-subscribers are characterized in that they are associated with or are located in a geographical area and possibly, as an additional characteristic, that they belong to a certain subscriber category. The method is initiated by the A-subscriber, who enters the subscriber service code via a terminal on his/her communications means. The subscriber service code includes a first code, or function code, which indicates that the A-subscriber wishes to utilize the service and also the manner in which the B-subscribers shall be connected to the A-subscriber, i.e. the desired type of connection. The subscriber service code also includes a second code, or connection number, which indicates to the telecommunications network the geographical area to which the A-subscriber wishes to be connected. The coupling number thus indicates the service switching stations, radio stations and base stations that shall be used in order to be able to find B-subscribers in this geographical area. The switching station to which the A-subscriber is connected identifies the entered information as switching service input data. A localizing procedure is then commenced with the intention of finding all B-subscribers that are located in the area indicated by the A-subscriber. These B-subscribers are collected in a preliminary list which is stored in a memory in the switching station.

Those subscribers which fulfil the conditions given in the subscriber service code are selected from the stored preliminary list of B-subscribers. One condition may be that the subscriber has the correct subscriber category. Depending on the type of connection concerned, a further selection of B-subscribers is then made, wherein a connection is set up to one or more of the B-subscribers, who therewith become called B-subscribers. Examples of the types of connection that may be invoved are connections to a B-subscriber, connections to several B-subscribers wherein the B-subscribers are connected with the A-subscriber successively in series, and connections to several B-subscribers wherein the B-subscribers are connected to the A-subscriber in parallel.

It should be noted that all subscribers that belong to the communications network and that can be reached by the A-subscriber with a GG-call are included in the designation "B-subscriber" in accordance with the invention. However, by called B-subscribers is meant only those B-subscribers that match the conditions contained in an entered GG-number and that are connected to the A-subscriber.

Thus, one object of the present invention is to provide a subscriber service for establishing a connection in a telecommunications network that includes a fixed network and a radio communications network and therewith enable an A-subscriber to reach either a single B-subscriber, certain B-subscribers, or all B-subscribers that is/are associated with a geographical area given by said A-subscriber.

A further object of the present invention is to enable the A-subscriber to reach either a single B-subscriber, certain B-subscribers, or all B-subscribers that is/are associated with a geographical area given by the A-subscriber and belongs/belong to a subscriber category indicated by said A-subscriber.

A service of the aforesaid kind affords a number of advantages. For instance, an A-subscriber is able to reach a single user, certain users or all users associated with a geographical area with the aid of the GG-number. The A-subscriber need not remember a large number of different telephone numbers to different B-subscribers, but only needs to be aware of a particular subscriber service number of the desired area, the GG-number, and possibly also the desired B-subscriber category. The service is open for users in public and private networks for both speech and data communication. Furthermore, as described in the aforegoing, the service is fully automated and it is unnecessary for the B-subscribers to enter information into the telecommunications network in order for the subscriber service to be used.

The invention will now be described in more detail with reference to a preferred exemplifying embodiment thereof and also with reference to the accompanying drawings.

BRIEF DESCRIPTION OF THE DRAWINGS

FIGS. 5A–5E show a more detailed flowsheet illustrating the inventive service.

DESCRIPTION OF PREFERRED EMBODIMENTS

Figure 1:
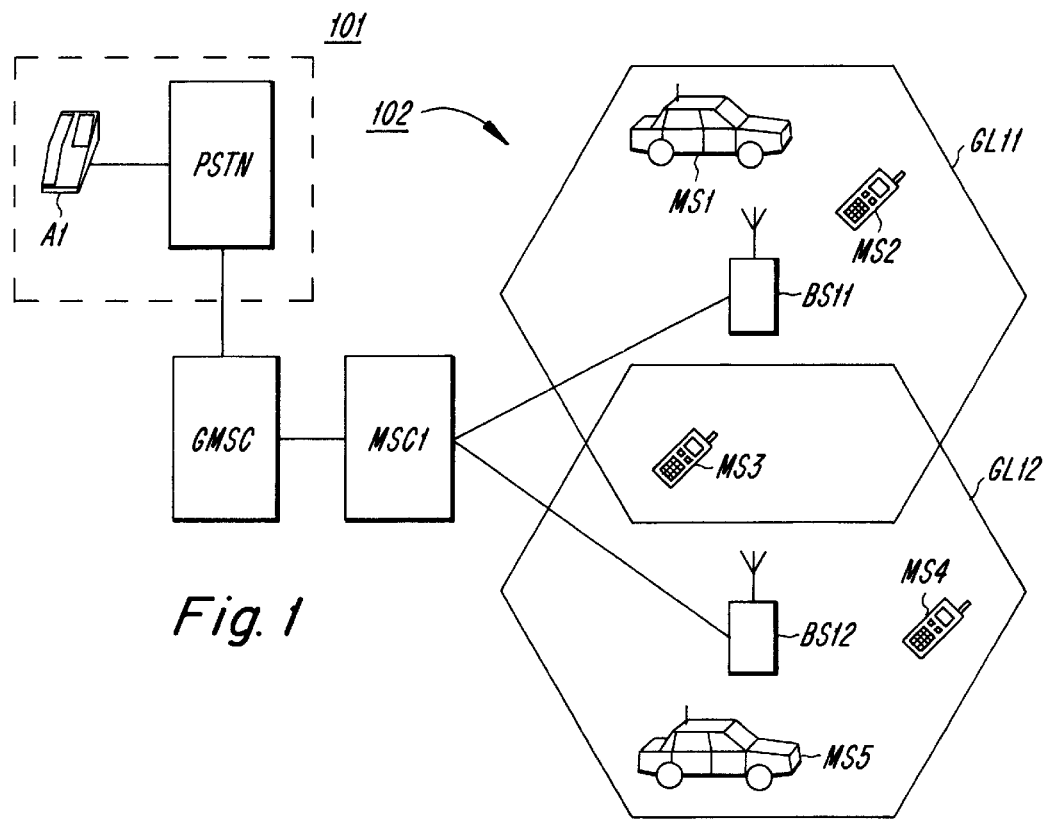
FIG. 1 shows schematically a public telecommunications network and illustrates an example where an A-subscriber wishes to come into contact with all users in a particular geographical area.

FIG. 1 shows an example of how the inventive subscriber service can be used, i.e. how a Geographic Group call, or GG-call, can be set up in a public telecommunications network 101, for instance. The telephone network includes a public switched telephone network PSTN and a cellular radio communications network 102. The radio network includes, among other things, a switching station or gateway mobile switching centre GMSC, a radio exchange or mobile services switching centre MSC1 and two base stations BS11 and BS12. These base stations cover two partially overlapping geographical areas GL11 and GL12, as shown in the Figure.

Assume that an A-subscriber A1 wishes to be connected to all users of mobiles in the two areas GL11 and GL12, i.e. the mobiles MS1–MS5 in the illustrated case, in order to deliver a message to said users. This may be the case for instance when a rescue centre wishes to issue warning as many people as possible in a disaster area. The message may comprise a recorded voice message (one-way communication) or a dialogue between the A-subscriber A1 and the mobile B-subscribers (two-way communication).

Figure 2:
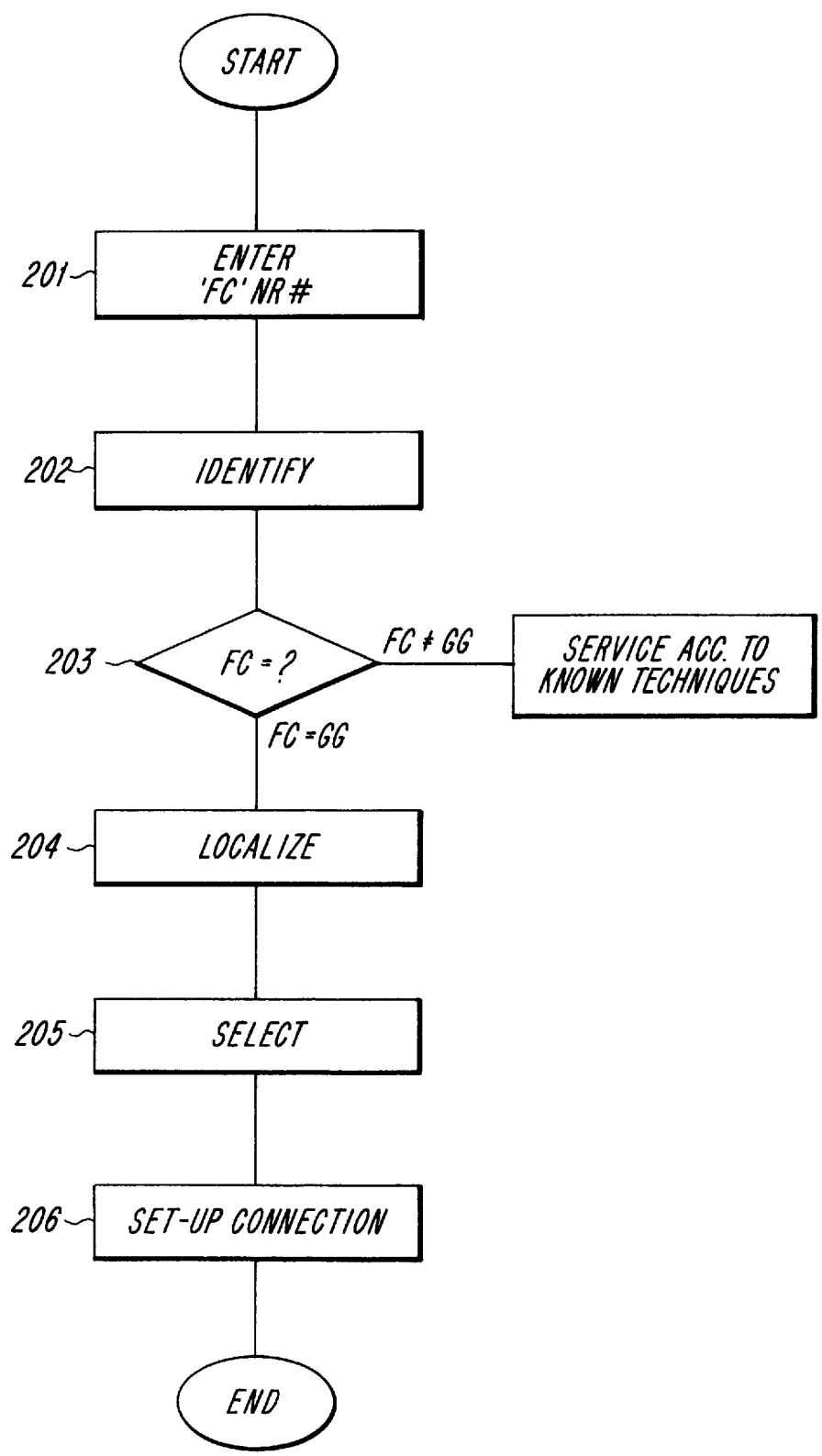
FIG. 2 is a simplified flowsheet illustrating the inventive subscriber service.

Referring briefly to FIG. 2, there is shown a flowsheet which schematically illustrates the subscriber service according to the invention. The A-subscriber initiates the service in step 201, by entering a special subscriber service number, a so-called GG-number, into the telecommunications network through the medium of a telephone, telefacsimile apparatus or some other type of telecommunications equipment. The GG-number is comprised of two parts, a first code or function code FC and a second code or coupling number NR (the GG-number=*FC*NR#). The "asterisk" and "square sign" keys on the telephone can be used to indicate where the GG-number begins and finishes, and to separate the two codes FC and NR one from the other. The function code FC indicates the type of service that the A-subscriber wishes to use, e.g. the service "Geographic Group" GG. The function code FC can also indicate whether the connection concerns a call to a single B-subscriber (SINGLE) or to several B-subscribers which are to be connected in series or in parallel (BROADCAST/S or BROADCAST/P). The following coupling number NR is used as routing information in setting up the connection between the A-subscriber and those B-subscribers that fulfil the conditions given in the GG-number, as described in more detail below. In step 202, the telephone network identifies the entered GG-number as service input data, and it is established in step 203 whether the data is input data for a service according to known techniques (FC≠GG) or input data for the inventive subscriber service (FC=GG). When it is established in step 203 that the input data concerns a GG-call (FC=GG), the procedure continues with the telephone network localizing the possible B-subscribers that fulfil the parameters given in the GG-number, i.e. possible B-subscribers associated with a given area, this procedure being effected in step 204. A mobile B-subscriber is associated with the geographical area in which the B-subscriber is located. In addition, both fixed and mobile B-subscribers can be associated with any geographical area whatsoever within the area covered by the radio network, by allocating a geographical membership to such mobile B-subscribers, as explained in more detail below. The result of the aforesaid localizing procedure in step 204 is a preliminary list of B-subscribers that are associated with the given geographical area. One of the B-subscribers in the preliminary list, some of said subscribers or all of said B-subscribers in said list is/are then selected in stage 205 in accordance with the function code FC (SINGLE, BROADCAST/S or BROADCAST/P) and possibly in accordance with a subscriber category that may have been included in the number NR, therewith to obtain a list of B-subscribers which fulfil the conditions given in the GG-number. All that then remains is to set up the connection, which is done in step 206.

It should be noted that the described GG-number infeed format comprising a first and a second code is merely an example. Other infeed formats are conceivable, such as an infeed of the function code FC after the infeed of the coupling number NR (post digit) or an infeed format which is controlled by an automatic voice prompt. The GG-number may alternatively consist of a single code corresponding to said first and second codes.

Referring now to FIG. 1, the A-subscriber A1 enters the GG-number, step 201 in FIG. 2, this GG-number including all users in the areas GL11 and GL12 in the case of the illustrated embodiment. The mobiles in the areas GL11 and GL12 are localized, step 204 in FIG. 2, whereafter all users with mobiles MS1–MS5 will be selected and connected to the A-subscriber, steps 205–206.

Figure 3:
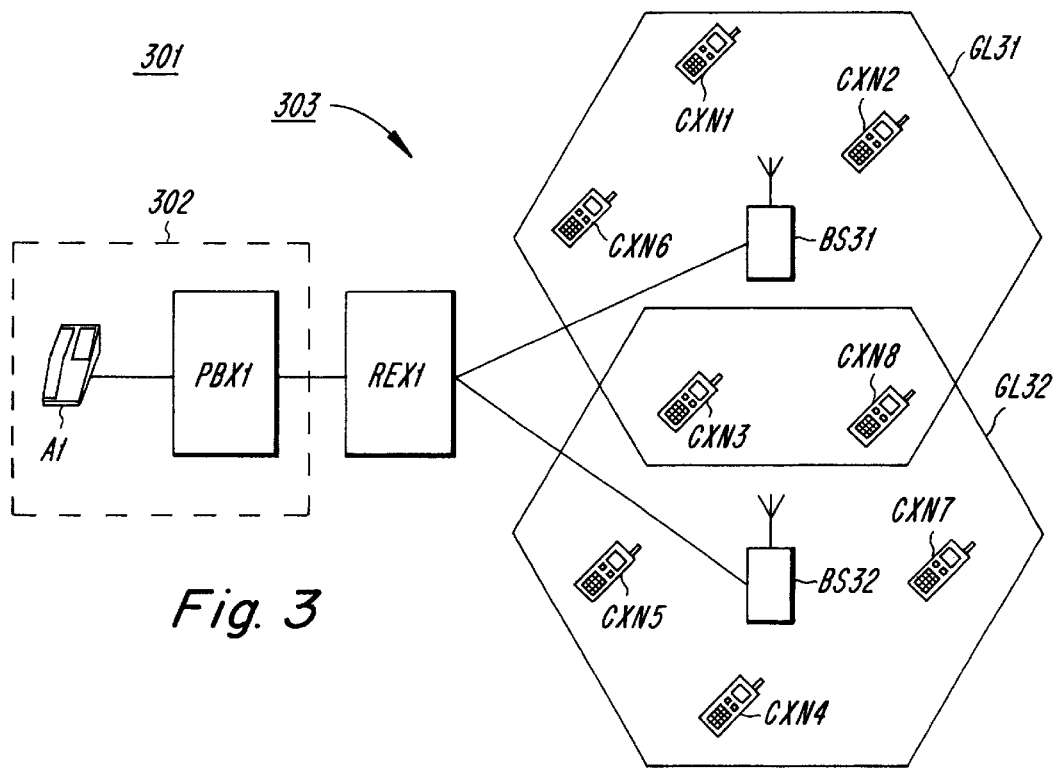
FIG. 3 shows schematically a private telecommunications network and exemplifies the occasion on which an A-subscriber wishes to come into contact with a security guard in an exhibition hall.

FIG. 3 shows a further example of how the subscriber service can be used and illustrates how a GG-call can be connected in a private telecommunications network 301. The telephone network includes a fixed network 302 and a radio communications network 303. The telephone network may be used for instance in an exhibition area which includes several exhibition halls and includes the switching station PBX1, the radio exchange REX1, and the base stations BS31 and BS32 that cover the geographical areas GL31 (e.g. hall 1) and GL32 (e.g. hall 2) respectively. The halls are occupied by personnel equipped with mobile telephones, for example security guards CXN1–CXN4, exhibition personnel CXN5–CXN6 and guides CXN7–CXN8.

Assume that the A-subscriber A1 wishes to be connected to one of the security guards in hall 1, i.e a guard located in the geographical area GL31. The A-subscriber will therefore enter the GG-number which indicates this, steps 201 and 202 in FIG. 2, wherewith the guards CXN1–CXN3 are localized, step 204 in FIG. 2. The guard that is actually connected to the A-subscriber is determined by the aforesaid selection process, step 205 in FIG. 2, this process being described in more detail below.

Figure 4:
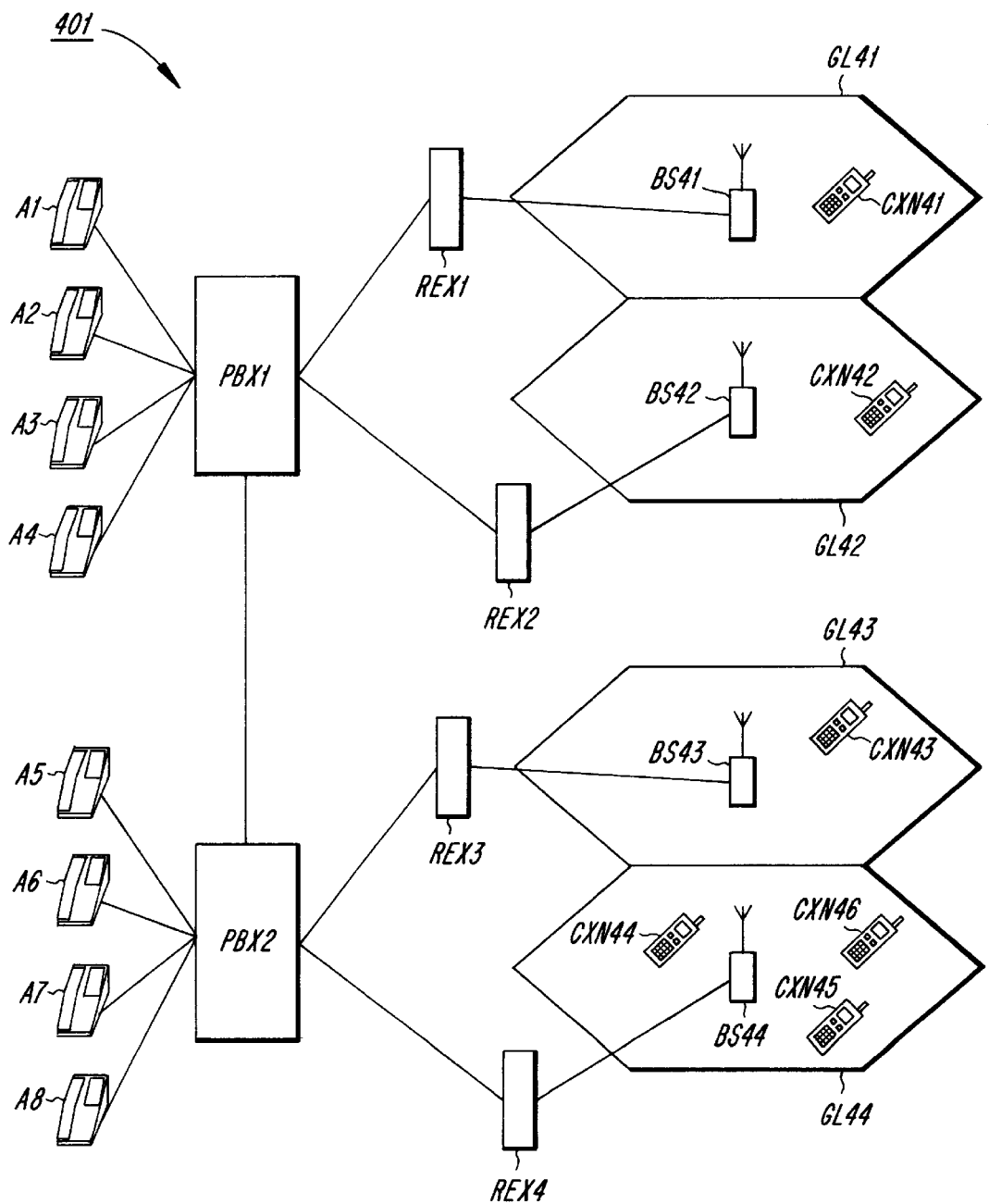
FIG. 4 shows schematically a private telecommunications network and illustrates how a subscriber service code or a GG-number can be compiled.
Figure 5A:
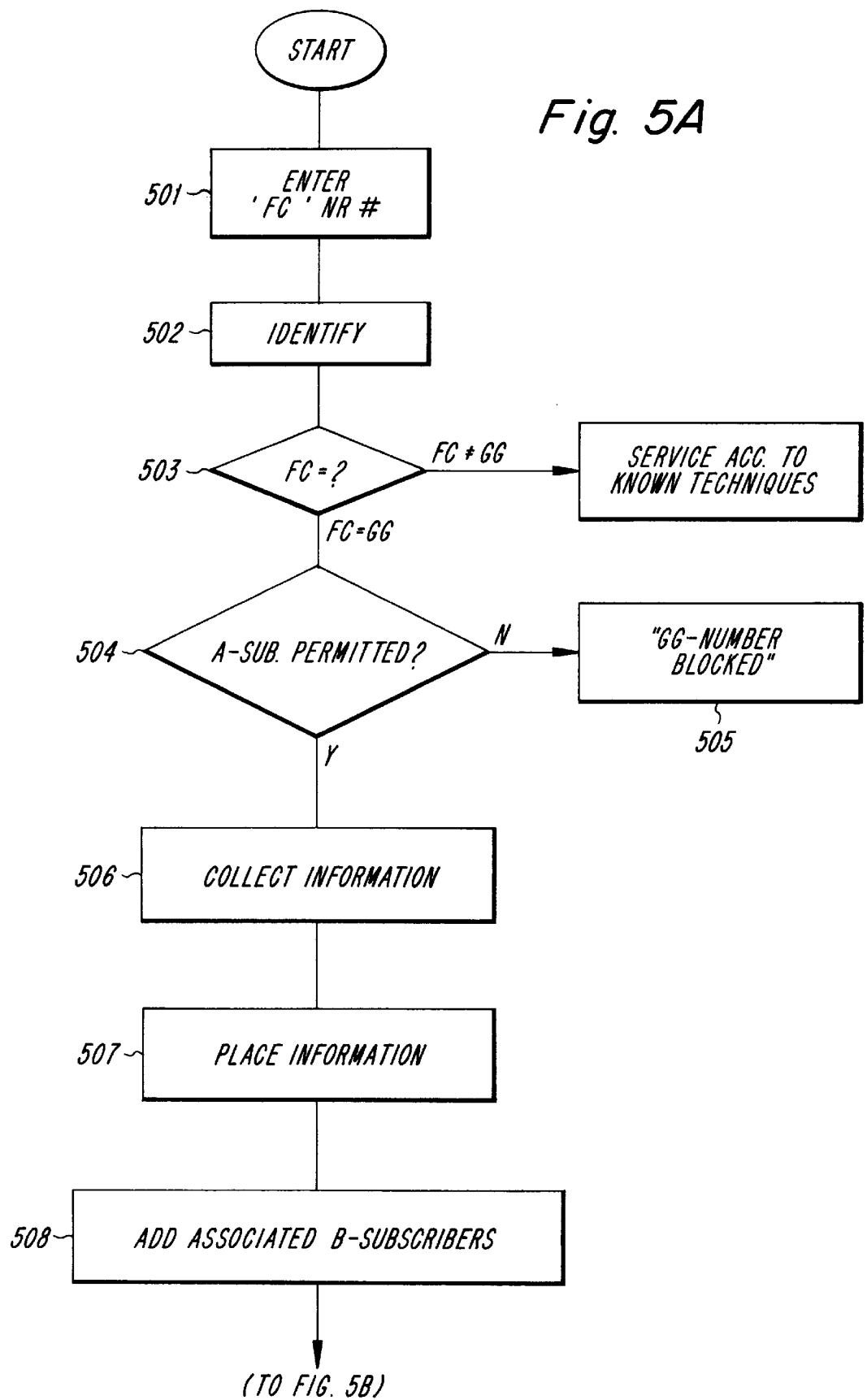
Figure 5C:
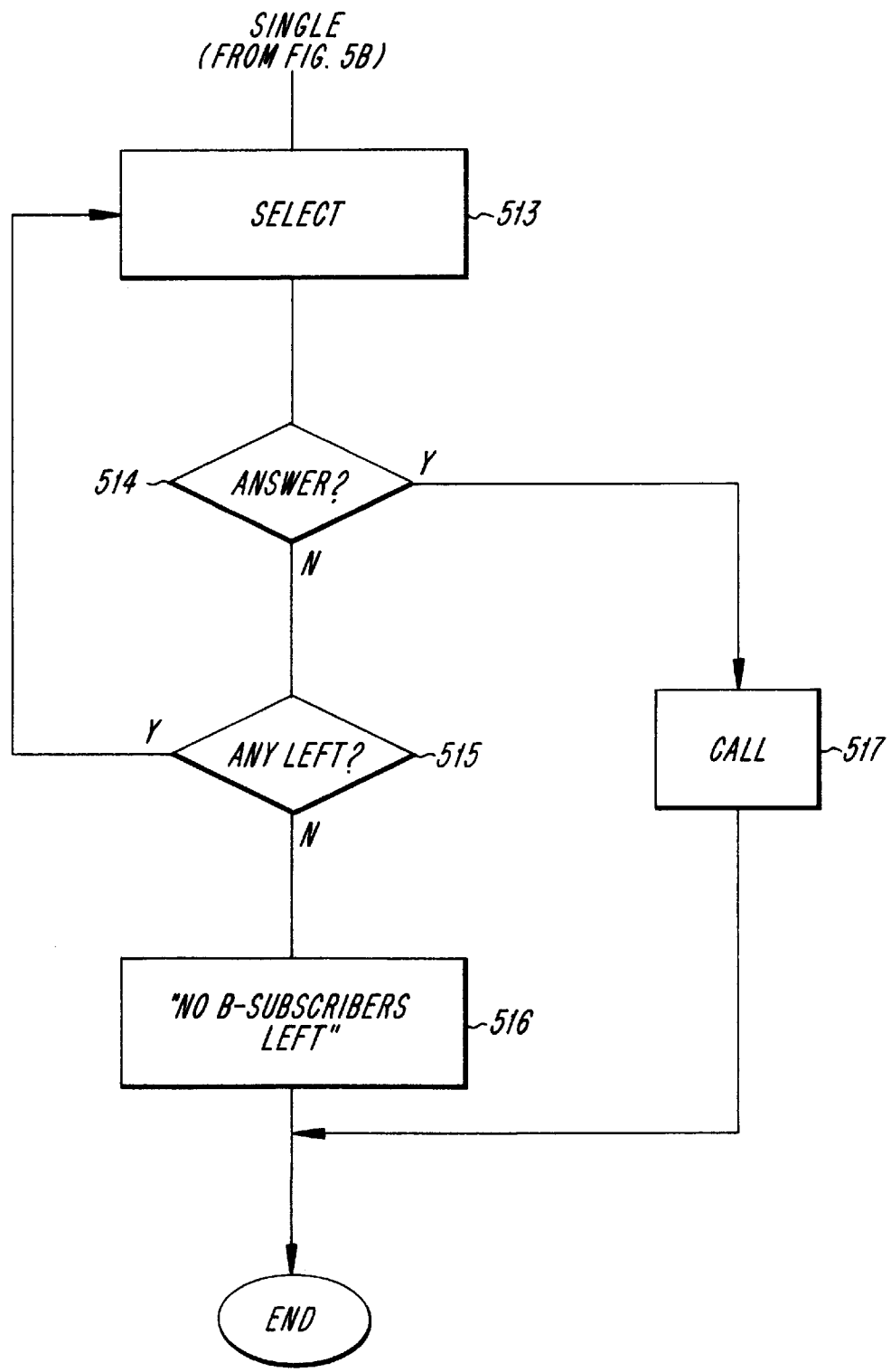
Figure 5E:
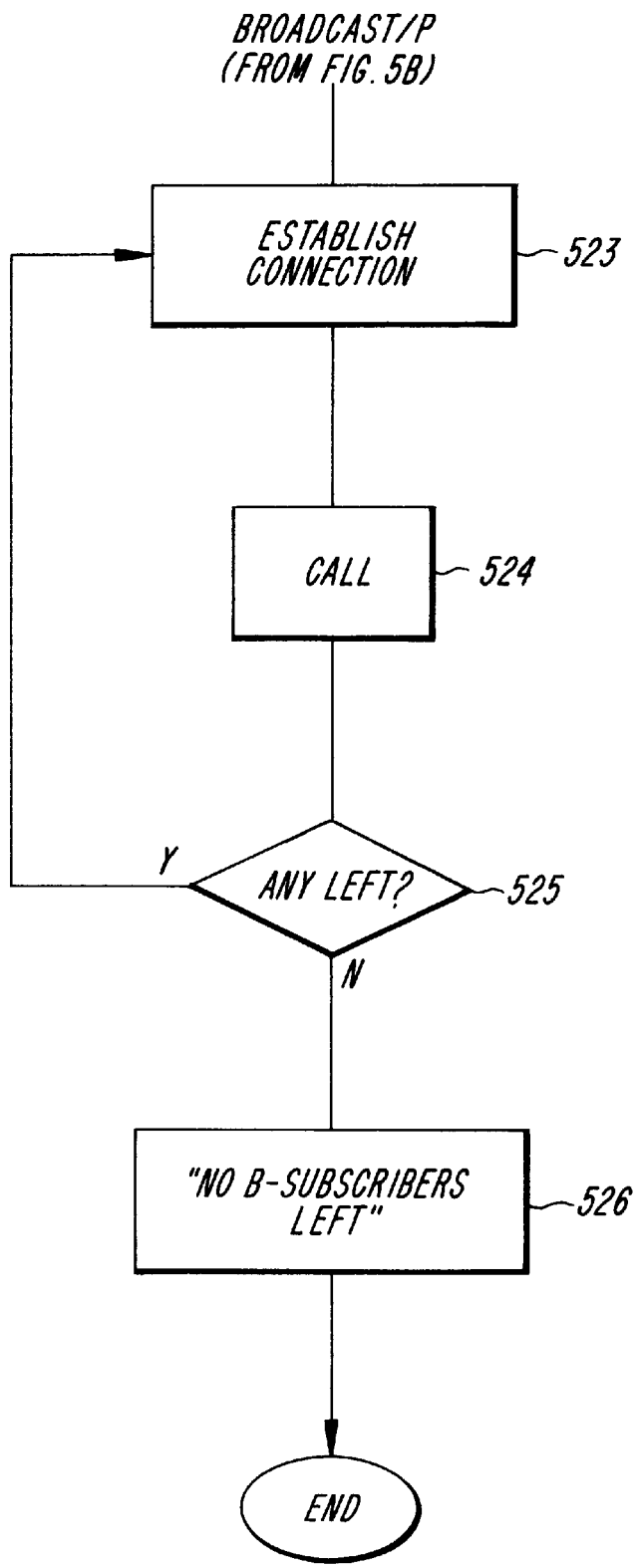

The manner in which a GG-number can be compiled will now be explained with reference to FIG. 4. The Figure illustrates a private telephone network 401 having fixed telephone extensions A1–A8 and mobile subscribers CXN41–XN46. The telephone network includes two switching stations PBX1–PBX2, four radio exchanges REX1–REX4 and four base stations BS41–BS44 which cover the geographical areas GL41–GL44. The subscribers CXN41–CXN46 can be allocated a subscriber category which defines their activity or function, e.g. a security guard or exhibition person. In the following example, it is assumed that the subscribers CXN43–CXN45 have been given the category of "guard". A mobile subscriber can also be allocated a geographical membership or affiliation, wherewith the mobile subscriber is then always associated with the given geographical area irrespective of where the mobile subscriber is located. However, the mobile subscriber is still associated with the geographical area in which he is located at that moment in time. The fixed extensions can also be allocated a geographic category and/or a subscriber category, wherein these fixed connections can be reached in a GG-call. Subscriber category and geographic membership can be allocated through separate commands when initiating the subscriber stations PBX.

As earlier mentioned, the subscriber service code or the GG-number may consist of two codes; a first code or the function code FC and a second code or the coupling number NR. In one preferred embodiment of the invention, the function code FC indicates that the call concerned is a GG-call and also indicates the type of GG-call concerned, therewith enabling three different types of GG-calls to be defined: a call to a single B-subscriber (SINGLE), a call to several B-subscribers mutually connected in series (BROADCAST/S) to the A-subscriber and a call to several B-subscribers mutually connected in parallel to the A-subscriber (BROADCAST/P). The function code FC can be written symbolically as FC=GG-SINGLE, FC=GG-BROADCAST/S or FC=GG-BROADCAST/P for the three different types of GG-calls. The coupling number NR indicates the switching stations PBX, radio exchanges REX and base stations BS that shall be used in locating B-subscribers in desired geographical areas. The coupling number NR thus includes a combination of numbers to the PBX, REX and BS stations, and a number for any possible subscriber category, and can be written symbolically as R=PBXx-REXy-BSz-"cat", where PBXx, REXy, BSz denote the aforesaid stations and "cat" denotes the subscriber category. Assume by way of example that the subscribers CXN44 and CXN45 are located in the geographical area GL44 covered by the base station BS44, and that these subscribers are security guards as mentioned in the aforegoing. When the extension A1 wishes to speak to a guard in the area GL44, any guard whatsoever, he enters the GG-number specific for this purpose, wherein the function code FC=GG-SINGLE and the coupling number NR are formed by the numbers to the switching station PBX2 and the radio station REX4, and to the base station BS44 and the subscriber category "guard". The GG-number that shall be entered by the A-subscriber is thus: *GG-SINGLE*PBX2-REX4-BS44-"guard"#. As a result, the subscribers CXN44–CXN46 are localized in the geographical area GL44 and the subscriber CXN44–CXN45 are then selected, because these subscribers belong to the subscriber category "guard". Because the A-subscriber wishes to speak with only one guard (FC=GG-SINGLE), a further selection is made in accordance with a selection procedure explained in more detail below, wherewith the subscriber CXN45 for instance is selected and connected to the A-subscriber.

FIGS. 5A–5E show a more detailed flowsheet illustrating the inventive service. As earlier mentioned, the A-subscriber enters the GG-number in step 501 and the GG-number is identified by the network in step 502. The nature of the subscriber service is established in step 503, i.e. whether the service is an earlier known service with the function code FC≠GG, or whether the service is an inventive service with the function code FC=GG. The illustrated example is concerned with the latter case and a check is then made in step 504 to ascertain whether or not the A-subscriber is allowed to call the entered GG-number. Thus, the inventive method carries the restriction that not all GG-numbers are open to all extensions. If the A-subscriber is not allowed to use the number entered, the A-subscriber is informed to this effect in accordance with alternative N in step 504, with the aid of an automatic voice message in step 505. The A-subscriber (and the B-subscribers) can, in general, be given different messages with the aid of special tone signals. When it is established that the A-subscriber is allowed to ring the entered number, in accordance with alternative J in step 504, information is collected in step 506 from the radio exchange REX given in the coupling number NR. The information obtained from the radio exchange in step 507 includes a preliminary list of available subscribers located in the area covered by the base station or stations given in the coupling number NR. Also added to the preliminary list in step 508 are any other subscribers who are not located in the area concerned but who are nevertheless associated with this area by virtue of having been allocated to said area, as described in more detail below. Those extensions in the preliminary list that have the correct subscriber category in accordance with the coupling number NR are picked out from the list in step 509, so as to obtain a list of B-subscribers that fulfil those criteria given in the GG-number. Alternatively, the method may be implemented such as to exclude the subscriber category. The GG-number entered by the A-subscriber will not then contain information regarding subscriber category and the selection process according to step 509 is not carried out. In step 510, a check is carried out to ascertain whether or not B-subscribers (fixed or mobile) that fulfil the conditions in the GG-number have been contacted, i.e. a check to establish that the list is not "empty". If no B-subscribers have been contacted, the A-subscriber is informed to this effect in step 511, with the aid of an automatic voice machine. When the result of this check establishes the availability of B-subscribers, a check is made in step 512 to ascertain the type of GG-call concerned, i.e. whether the call is to a single B-subscriber (FC=SINGLE) or a call to several B-subscribers (FC=BROADCAST/S or FC=BROADCAST/P).

When the call is to a single B-subscriber, i.e. when FC=single in step 512, one of the B-subscribers on the list is selected in step 513 in accordance with a selection procedure and the call request is then sent to the selected B-subscriber. This selection can be made in several ways. For instance, the choice can be made according to priority, according to the longest or shortest idle time, or in accordance with a paging pattern. Selection by priority means that the B-subscriber that has the highest priority is selected, this priority being given in a subscriber register as explained below. Priority involves dividing the B-subscribers into different groups having priorities of different rankings, wherein the first B-subscriber to be contacted in a group having the highest possible priority will be selected for connection with the A-subscriber. Selection in accordance with the longest or shortest idle time means that the B-subscriber who has not telephoned for the longest or shortest time respectively is chosen, while selection in accordance with a paging pattern means that the B-subscriber who heads the list is chosen. The selection procedure employed may either be predetermined and stored in the switching stations PBX or may be determined by the A-subscriber in accordance with information entered thereby. If the call request is not answered within a given period of time, the number called is erased from the list in accordance with alternative N in step 514. A check is then made in step 515 to ascertain whether or not any B-subscribers remain on the list. If no B-subscribers remain on the list in accordance with an alternative N, a message to this effect is sent to the A-subscriber in step 516 and the service is then terminated. If B-subscribers are found on the list in accordance with alternative J, a jump is made back to step 513 and a new B-number is selected in accordance with the selection procedure. When the called B-subscriber answers the call in accordance with alternative J in step 514, a call connection is established between the A-subscriber and the selected B-subscriber in step 517 in a known manner. The connection is released in a conventional manner when the call has ended.

When the call is directed to several B-subscribers which are to be connected seriely, i.e. when FC=BROADCAST/S in step 512, a request is sent to the first B-subscriber on the list to call the A-subscriber (step 518). The B-subscribers on the list are connected to the A-subscriber serially, i.e. one after the other. As in the case of step 514, the called B-subscriber number is erased from the list in accordance with alternative N in step 519 when the number fails to answer within a given time period, whereafter a check is made in step 520 to ascertain whether or not any B-subscribers remain on the list. If no B-subscribers remain on the list, according to alternative N a message to this effect is sent to the A-subscriber in step 521 and the service is then terminated. If B-numbers are found on the list, according to alternative J in step 520 a jump back to step 518 is made and a new B-number is selected, i.e. that number which is first on the list. When the called B-subscriber answers, in accordance with alternative J in step 519, a call connection is set up between the A-subscriber and the B-subscriber in step 522, in a known manner. The connection is released in a conventional manner when the call has ended, and the B-number to which the call was made is erased from the list and a check is then made in step 520 to ascertain whether or not any B-numbers remain on the list. Step 518 or step 521 is then carried out in the aforedescribed manner, depending upon whether or not B-subscribers are still found on the list.

When the call is directed to several B-subscribers who shall be connected in parallel, i.e. when FC=BROADCAST/P in step 512, the B-subscribers are connected to the A-subscriber in step 523. Parallel coupling of the call involves the B-subscribers being connected to the A-subscriber simultaneously and in parallel. When the B-subscribers are so numerous that communication resources are insufficient to meet all B-subscribers (register, radio channels, etc.), as many B-subscribers as the communication resources will allow are connected, wherein the B-subscribers remaining on the list are connected after the connections of those B-subscribers that were first connected have been released. Parallel connection with several B-subscribers is usable primarily for one-way communication, when wishing to deliver a message to a large group simultaneously. When the message has been given/the call has been terminated in step 524, the called B-subscribers are erased from the list and a check is then made in step 525 to ascertain whether or not B-subscribers still remain on the list. If no B-subscribers remain on the list, according to alternative N in step 525, a message to this effect is sent to the A-subscriber in step 526 and the service is then terminated. On the other hand, if B-numbers still remain on the list, according to alternative J in step 525, a jump is made back to step 523 and the remaining B-subscribers are connected to the A-subscriber.

Figure 6:
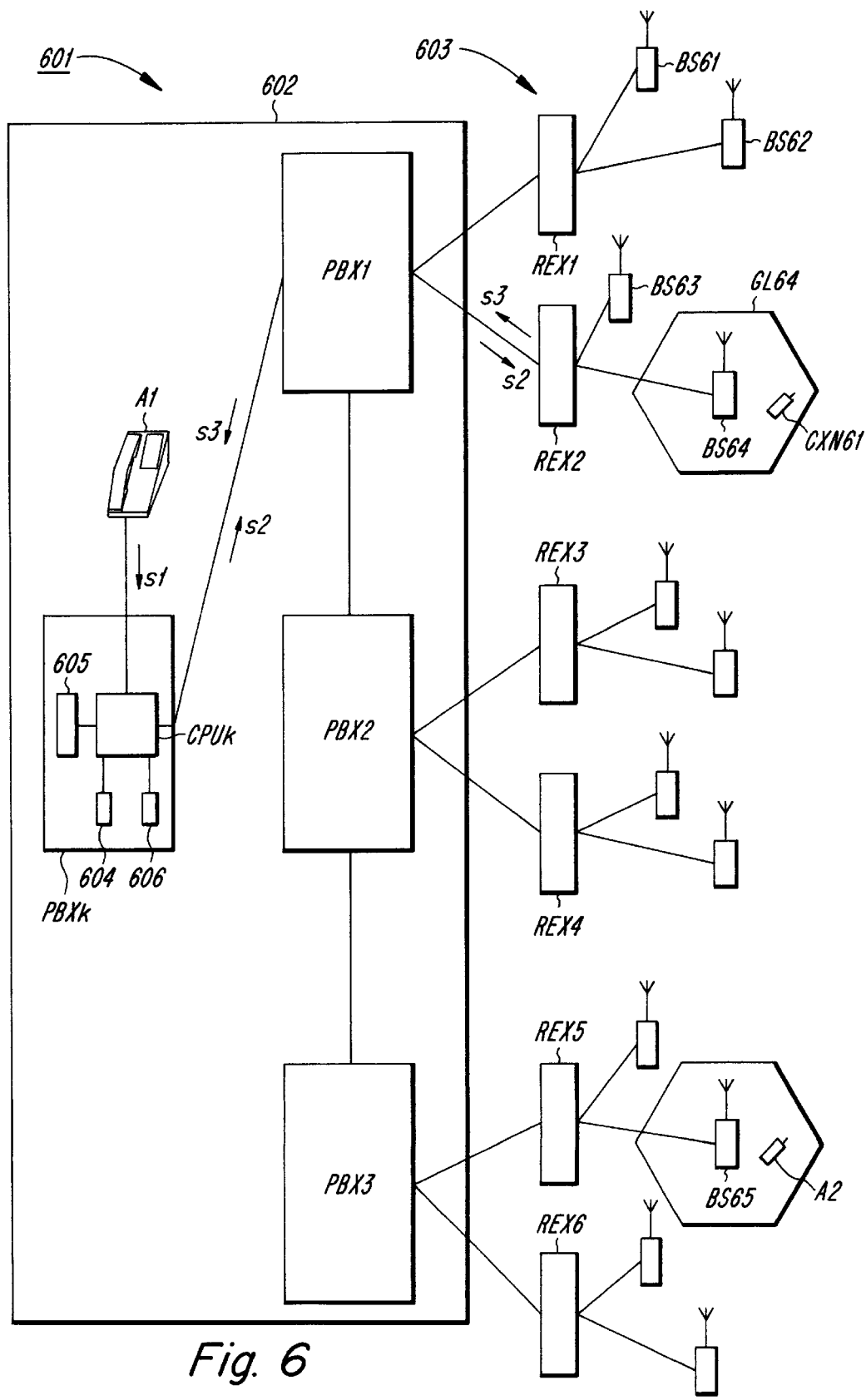
FIG. 6 is a block schematic illustrating how the inventive service is implemented in a private telecommunications network.

FIG. 6 illustrates a private telecommunications network 601 in which the inventive subscriber service is implemented. The component parts of the telecommunications network and the signalling applied when practicing the invention will be described in more detail with reference to this Figure. The telephone network includes a fixed network 602 to which fixed extensions are connected, such as the illustrated extension A1, and a radio communications network 603 having mobile subscribers, such as the subscriber CXN61. The fixed network includes switching stations PBX and the radio network includes radio exchanges REX and base stations BS. Each base station covers a certain geographical area GL, which in the FIG. 6 illustration is a geographical area GL64 covered by the base station BS64.

Assume that a calling A-subscriber (the fixed subscriber A1) wishes to call a so-called patent engineer located in a given geographical area (for instance on floor 8 of an office complex) and that this geographical area is covered by the base station BS64. The base station BS64 is coupled to the radio exchange REX2 which in turn is coupled to the switching station PBX1. The subscriber A1 is connected to a switching station PBXk. The switching station PBXk is also connected to one or more "own" radio exchanges and base stations in a manner similar to that shown with regard to the switching stations PBX1–PBX3, although this has not been shown in FIG. 6. As the A-subscriber A1 lifts the telephone receiver, a connection is established between the A-subscriber and the switching station PBXk in a known manner wherewith a dialling tone is sent to the A-subscriber. The A-subscriber now enters the GG-number with a signal s1 (the GG-number=*FC*NR#), which can be written symbolically as *GG-SINGLE*PBX 1-REX2-BS64-"patent engineer"# and states "a patent engineer on floor 8".

The GG-number, the signal s1, is received by a control unit CPUk in the switching station PBXk and is identified as being a number that relates to a subscriber service.

When the subscriber service was implemented in the telecommunications network 601, geographical areas were initiated (allocated) for different GG-numbers. For instance, the geographical area GL64 may be allocated a GG-number 2000 through a command GGINI:DIR=2000,PBXN01, REXN02,BSN064. This initiation is effected in the switching stations, wherewith the number combination 2000 will be decoded in the switching station PBXk and results in a coupling path, PBX1, REX2, BS64. Similarly, B-subscribers can be allocated different subscriber categories which denote the nature of the work carried out by the B-subscriber or the subscriber user post, e.g. through the medium of a command EXTEI:DIR=1000,USRCAT=01 which allocates to a B-subscriber having extension number 1000 a subscriber category 01, which may, for instance, represent "patent engineer". B-subscribers may also be permanently associated with one or more geographical areas, e.g. through a command GGEXI:GGDIR=2000;EXDIR=1500&1501, wherewith subscribers having extension numbers 1500 and 1501 will be permanently associated with the geographical area that has GG-number 2000, in addition to the geographical area in which the B-subscribers are actually located.

The GG-number is thus decoded by the control unit CPUk in the switching station PBXk, wherewith it is established that the call is a GG-call since the function code FC=GG, step 503 in FIG. 5. A check is then made to ascertain whether or not the A-subscriber is authorized to call the entered GG-number. The authority of the A-subscriber is checked by the control unit checking a subscriber register 606 in the switching station PBXk. The subscriber register contains data relating to the connections or the subscribers, for instance such as level of authorization of each subscriber. The authorization level in combination with a traffic matrix, compiled in accordance with known technique, determines the GG-numbers which the A-subscriber is allowed to call. If the result of this check made in the subscriber register 607 shows that the A-subscriber is not authorized, a message is sent to the A-subscriber from a voice answering machine 604 under the control of the control unit CPUk. If the A-subscriber is authorized to make the call, the control unit CPUk collects information as to which B-subscribers are associated with the geographical area given by the coupling number NR, step 506 in FIG. 5. The information is collected by the control unit CPUk establishing a connection and sending a signal s2 to the radio exchange given in the coupling number, in this case to the radio exchange REX2, via the switching station PBX1. The radio exchange REX2 has a list of the mobile subscribers located within the areas covered by the base stations BS63 and BS64 connected to the radio exchange REX2. A signal s3 is sent from the radio exchange REX2 to the control unit CPUk in response to the signal s2. The signal s3 contains information on all mobile subscribers that are located within the area covered by the base station BS64 (floor 8) at that moment in time. The control unit CPUk stores the information content of the signal s3 in a memory 605 in the switching station PBXk, thereby providing a preliminary list of all possible B-subscribers.

The control unit also checks whether any remaining extensions have been allocated the geographical area concerned. Information to this effect is found stored in the subscriber register 606 in the switching station PBXk. A fixed subscriber can thus have a geographical membership where the geographical area is, e.g., the area covered by the base station BS64. This subscriber will then be added to the preliminary list of B-subscribers. Mobile subscribers can also be given a permanent geographic membership, by allocating thereto a geographical area in the subscriber register 606. A mobile subscriber will then be associated with two geographical areas, firstly the area in which the mobile subscriber is temporarily located and secondly the area stated in the subscriber register 606. If the control unit finds in the register 606 fixed or mobile extensions that have the geographical membership or affiliation "floor 8", these extensions will be added to the preliminary list in memory 605.

Depending on the system in which the invention has been implemented, it may be so that no prepared list of the mobile subscribers who are located within the areas covered by respective base stations is available when the control unit transmits the signal s2. In such cases, the signal s2 sent to the radio exchange REX2 will result in a paging message being sent from the base station concerned in a known manner. Those mobiles which capture the paging message identify themselves so as to enable a list of mobiles within the area covered by the base station to be set up in the radio exchange, wherewith the signal s3 can then be sent to the control unit CPUk.

There are then selected from the preliminary list in the memory 605 those B-subscribers who have the right subscriber category in accordance with a preferred embodiment, i.e. B-subscribers having the category "patent engineer" in the case of the present example (step 509). It is also possible to select B-subscribers solely in accordance with the type of call concerned, as explained below. The subscriber category of fixed and mobile subscribers is also given in the subscriber register 606. The control unit CPUk compares the category given in the coupling number NR with the category of the subscribers in the preliminary list, therewith obtaining a list of B-subscribers who fulfil all of the conditions given in the GG-number, namely a patent engineer on floor 8. The list of selected B-subscribers that have the right category is stored in the memory 605. If the result shows that no subscribers who fulfil the conditions in the GG-number are to be found, a message to this effect is delivered to the A-subscriber from the voice answering machine 604 under the control of the control unit CPUk, step 511 in FIG. 5. If subscribers are found on the list, the control unit establishes the type of GG-call concerned (step 512).

In the aforedescribed example, the call was concerned with a call to a single patent engineer, i.e. the control unit established that FC=GG-SINGLE, wherewith only one subscriber shall be selected from the list. As mentioned in the aforegoing, this selection can be implemented in accordance with different selection procedures. These selection procedures are executed by the control unit, whereupon one subscriber is selected. A call request is then sent to this subscriber in a known manner (step 513 in FIG. 5C). If the selected B-subscriber answers the call, the A- and B-subscribers are connected up in the switching station PBXk, wherewith a call connection is obtained in a known manner. If the call to the B-subscriber is unanswered, the CPUk will interrupt the call request after a predetermined time has lapsed and select a new B-subscriber instead. In this case, the control unit first erases the B-subscriber that has already been "used" and checks whether other B-subscribers remain on the list in accordance with the description of FIGS. 5A–5E. If no B-subscribers are found on the list, the A-subscriber is informed to this effect by the voice answering machine 604 under the control of the control unit. On the other hand, if B-subscribers are found on the list, the control unit will select a new B-subscriber in accordance with one of the selection procedures and the sequence is repeated in accordance with the aforegoing until a B-subscriber answers or until no B-subscribers remain on the list. Alternatively, the A-subscriber can determine the selection procedure that shall be used by entering information in response to questions asked by the voice answering machine under the control of the control unit CPUk.

It will now be assumed that the A-subscriber wishes to speak with all patent engineers (one by one) present on floor 8, i.e. that the control unit establishes that FC=GG-BROADCAST/S in step 512. The control unit will then send a call request to the first subscriber in the list of B-subscribers that have the right category. The control unit monitors the response to the call request and will interrupt the request if no answer is obtained within a given period of time, whereafter the control unit erases this B-number from the list. The control unit then checks as to whether or not B-numbers remain in the list, wherewith a call request is sent to the next B-subscriber on the list when said list contains several B-subscribers. When the call request is answered, the A- and B-subscribers are mutually connected in the switching station PBXk and therewith obtain a call connection. The control unit releases the connection and erases the B-number when the call is ended. The aforesaid check is then repeated with the intention of establishing whether or not more B-subscribers are found on the list in the memory 605.

It is now assumed that the A-subscriber wishes to speak with all patent engineers on floor 8 at the same time, i.e. the control unit establishes that FC=GG-BROADCAST/P in step 512. The control unit will now send a call request to as many of the B-subscribers in the list as the communication resources will permit. When the B-subscribers have answered the call request, the control unit establishes a connection with each of said subscribers, either for one-way or two-way communication. When this communication is ended, the control unit releases the connections and erases the contacted numbers of the B-subscribers from the list. If the communication resources did not permit all B-subscribers to be connected in the first instance and consequently the list still contains B-subscribers after having erased the contacted B-subscribers, the aforedescribed procedure is repeated until all B-subscribers in the list have been contacted and connected.

According to one embodiment, all switching stations PBX are provided with the equipment required to perform the service, such as the central unit CPUk, the memory 605, the register 606, etc. According to another embodiment, only a small number of switching stations are provided with this equipment, wherewith A-subscribers who are connected to a switching station which does not possess such equipment are directed to a switching station which is provided with said equipment, when the A-subscriber wishes to utilize the subscriber service.

When the A-subscriber is a mobile subscriber and wishes to make a GG-call, the service is performed in the same way as that described above. The mobile A-subscriber A2 enters the desired GG-number and is connected to the switching station PBX3 in a known manner, via the base station BS65 and the radio exchange REX5. The switching station PBX3 then operates in the same way as the switching station PBXk when the GG-call has been generated by the fixed A-subscriber A1.

According to the invention, a geographical area corresponds to the area or areas covered by one or more base stations. In turn, the area covered by a base station corresponds to the area within which a mobile station can establish radio communication with the base station, normally referred to as a cell. The geographical area may also be a cell sector when the base station uses directional transmission with directional antennas.

In the aforegoing embodiments, the control unit has been described as a part of the switching stations, although it will be understood that this is solely a preference and not an absolute requirement. The control unit may, for instance, also be implemented in a radio exchange if so desired.

It will therefore be understood that the invention is not restricted to the aforedescribed and illustrated exemplifying embodiments thereof and that these embodiments can be modified within the scope of the following Claims. For instance, the inventive subscriber service is not tied to any particular standard and can therefore be used in systems according to standards for public and private radio communications systems, such as NMT, GSM, AMPS, D-AMPS, TACS, DECT or CT3.

What is claimed is:

1. A method of performing a subscriber service in a telecommunications network (601, 101) which includes at least one switching station (PBX1–PBX3, PBXk; GMSC), at least one radio exchange (REX1–REX6; MSC1) and at least one base station (BS61–BS64; BS11–BS12) for setting-up a connection between a calling A-subscriber (A1) and at least one called B-subscriber (CXNT1, MS1–MS5), said method comprising:

allocating subscriber service codes to separate geographical areas (GL11–GL12, GL41–GL44, GL64), each including at least the area covered by a base station;

associating the B-subscribers (MS1–MS3, CXN44–CXN46, CXN61) with a respective geographical area (GL11, GL44, GL64);

entering the subscriber service code, said code being entered by the A-subscriber and indicating the geographical area (GL64; GL11–GL12) in which the connection with the B-subscribers shall be established;

localizing the B-subscribers that are associated with the geographical area (GL64; GL11–GL12) given by the A-subscriber;

selecting at least one of the localized B-subscribers; and establishing the connection from the A-subscriber to the selected B-subscribers, said subscribers constituting the called B-subscribers.

2. A method according to claim 1, wherein the telecommunications network includes a fixed network (602, PSTN) and a radio communications network (603, 102), and wherein the method further comprises allocating to the B-subscribers a subscriber category which indicates the user activity or function of the respective B-subscribers.

3. A method according to claim 2, wherein entering of the subscriber service code also gives the subscriber category of the B-subscribers; and entering of the subscriber service code is effected by the A-subscriber entering said code from its terminal (A1) to a central unit (CPUk) in the switching station (PBXk).

4. A method according to claim 1, wherein the B-subscribers are associated with the geographical are given by the A-subscriber by virtue of their being located in said area.

5. A method according to claim 1, wherein the B-subscribers are associated with the geographical area given by the A-subscriber by virtue of their being allocated a geographical membership or affiliation in a subscriber register (606) in the switching station (PBXk).

6. A method according to claim 1, wherein the entered subscriber service code also indicates the type of connection concerned (SINGLE, BROADCAST/S, BROADCAST/P) which, in turn, indicates how the B-subscribers shall be connected to the A-subscriber.

7. A method according to claim 6, wherein entry of the subscriber service code comprises:

entering a first code (FC) which indicates the type of connection concerned (SINGLE, BROADCAST/S, BROADCAST/P); and entering a second code (NR) which indicates the geographical area to which the connection to the B-subscribers shall be established.

8. A method according to claim 7, wherein the entered second code (NR) also gives the subscriber category of the B-subscribers.

9. A method according to claim 7, where the method further comprises identifying the first code (FC) and the second code (NR) in the central unit (CPUk), said central unit receiving and identifying said first and said second code as subscriber service input data in accordance with the first code (FC).

10. A method according to claim 7, wherein localizing of B-subscribers comprises:

collecting information concerning those B-subscribers that are located in the geographical area given by the A-subscriber, said area comprising the area covered by at least one base station (BS4) and said base station being identified in the second code (NR);

sending a signal (s2) from the central unit (CPUk) in the switching station (PBXk) to a radio exchange (REX2) via a switching station (PBX1), wherein the radio exchange (REX2) and the switching station (PBX1) are identified in the second code (NR); and sending from the radio exchange (REX2) to the central unit (CPUk) a signal (s3) which contains said information.

11. A method according to claim 10, wherein all mobile B-subscribers who are located in the geographical area given by the A-subscriber and all mobile and fixed B-subscribers which are allocated the geographical membership that coincides with the geographical area given by the A-subscriber are included in the information relating to said B-subscribers, wherein said method comprises the further step of storing information in a preliminary list of presumptive B-subscribers in a memory (605) in the switching station (PBXk).

12. A method according to claim 7, wherein localizing of B-subscribers includes collecting information concerning those B-subscribers that are permanently associated with the geographical area given by the A-subscriber, wherein the control unit (CPUk) questions a subscriber register (606) in which information relating to the geographical mebership allocated to the B-subscribers.

13. A method according to claim 11, wherein said selection comprises selecting one of the B-subscribers from the preliminary list in accordance with a predetermined selection procedure, where the first code (FC) indicates that the connection is a connection to one single B-subscriber (SINGLE).

14. A method according to claim 13, wherein the selection procedure is comprised of a predefined paging pattern.

15. A method according to claim 13, wherein the selection procedure comprises selecting the B-subscriber in the list that was latest connected to the A-subscriber.

16. A method according to claim 13, wherein the selection procedure comprises selecting the B-subscriber in said list of subscribers that has the highest priority, said B-subscribers being divided in the subscriber register (606) into groups of different priorities.

17. A method according to claim 11, wherein the selection procedure comprises:

comparing the subscriber category of the B-subscribers in the preliminary list with the subscriber category given by the A-subscriber in the second code (NR);

selecting B-subscribers from the preliminary list in the memory (605) in accordance with the subscriber category of the B-subscribers; and storing a list of the selected B-subscribers in the memory (605).

18. A method according to claim 17, wherein the selection procedure comprises selecting one of the B-subscribers from the list in accordance with a predetermined selection procedure when the first code (FC) indicates that the connection is a connection to one single B-subscriber (SINGLE).

19. A method according to claim 17, wherein the selection procedure comprises selecting all of the B-subscribers in the list when the first code (FC) indicates a connection to several B-subscribers (BROADCAST/S, BROADCAST/P).

20. A method according to claim 11, wherein the selection procedure comprises selecting all of the B-subscribers in the preliminary list when the first code (FC) indicates that the call shall be connected to several of the B-subscribers (BROADCAST/S, BROADCAST/P).

21. A method according to claim 20, wherein establishment of the connection comprises connecting the B-subscribers in the list singly to the A-subscriber when the first code (FC) indicates serial connection of the B-subscribers in the list.

22. A method according to claim 20, wherein establishment of the connection comprises connecting the B-subscribers in the list with the A-subscriber in parallel when the first code (FC) indicates parallel connection of the B-subscribers in the list.

23. A method according to claim 1, wherein establishment of the connection comprises:

connecting a first part of the connection from the A-subscriber to the switching station (PBXk);

sending a call request from the switching station (PBXk) to the selected B-subscribers; and setting-up a second part of said connection from the switching station (PBXk) to the selected B-subscribers, which therewith constitute called B-subscribers when they answer said call request.

24. A telecommunications network (601, 101) in which there is provided a subscriber service for establishing a connection between a calling A-subscriber (A1) and at least one called B-subscriber (CXN61, MS1–MS5), wherein the telecommunication network (601, 101) includes at least one switching station (PBX1–PBX3, PBXk; GMSC), at least one radio exchange (REX1–REX6; MSC1) and at least one base station (BS61–BS64); BS11–BS12), wherein the calling A-subscriber (A1) has means whereby a subscriber service code can be entered, said code entered by said A-subscriber indicating a geographical area (GL64) to which the connection with the B-subscriber shall be established;

Wherein at least one of the switching stations (PBXk) has a control unit (CPUk) which includes subscriber service storage means and means for receiving and decoding the subscriber service code;

wherein means (606, REX2) are provided for storing the B-subscribers that are associated with respective geographical areas;

wherein the control unit (CPUk) has means for localizing the B-subscribers that are associated with the geographical area given by the A-subscriber in the subscriber service code and means for storing the localized B-subscribers in a memory (605);

wherein the control means (CPUk) has means for selecting at least one of the B-subscribers in the memory (605); and wherein the control unit (CPUk) has means for ordering the connection to be established to the selected B-subscribers.

25. A telecommunications network according to claim 24, including a fixed network (602, PSTN) and a radio communications network (603, 102), wherein a radio exchange (REX2) has means for sending to the control unit (CPUk) a signal (s3) which contains information concerning the B-subscribers that are associated with the geographical area (GL64) given by the A-subscriber in the subscriber service code, by virtue of their being located in said area.

26. A telecommunications network according to claim 24, wherein the control unit (CPUk) has means for questioning a subscriber register (606) provided in at least one of the switching stations (PBXk) and containing information concerning those B-subscribers that are permanently associated with the geographical area (GL64) given by the A-subscriber in the subscriber service code when localizing the B-subscribers, said B-subscribers permanently associated with this area (GL64) being stored in the memory (605).

27. A telecommunications network according to claim 24, wherein the subscriber service code decoding means identifies a connection path (PBX1, REX2, BS64) to the geographical area (GL64) given by the A-subscriber when decoding the subscriber service code, said connection path being used in localizing the B-subscribers and in establishing the connection to the selected B-subscribers.

* * * * *